United States Patent Office 3,392,125
Patented July 9, 1968

3,392,125
METHOD FOR PREPARING AN ALPHA ALUMINA CATALYST SUPPORT
Allan C. Kelly, Palo Alto, Hebon J. Ducote, Saratoga, and Leo R. Barsotti, San Mateo, Calif., assignors to Kaiser Aluminum & Chemical Corporation, Oakland, Calif., a corporation of Delaware
No Drawing. Filed July 11, 1963, Ser. No. 294,231
13 Claims. (Cl. 252—461)

ABSTRACT OF THE DISCLOSURE

Alpha alumina shaped particles having a pore volume distribution such that a major portion of the pores have a diameter greater than 580 A. and having a crushing strength exceeding 10 pounds per particle, said strength based on 6 x 8 mesh particles. The procedure for producing such particles and their use as support material for oxidizing catalysts is also disclosed.

---

This invention relates to novel alumina shaped particles or bodies which are suitable for use as support material for catalysts, particularly for catalytic oxidation of carbon monoxide and hydrocarbons such as contained in automotive exhaust gases. More particularly it relates to novel alpha alumina shaped particles characterized as having improved resistance to abrasion, improved crushing strength and a large pore diameter and to oxidizing catalysts made therefrom, and further to an improved method for the preparation of the shaped particles from alumina hydrate such as is obtained by precipitation from sodium aluminate in the well-known Bayer process.

Exhaust gases from gasoline or diesel engines which are discharged to the atmosphere contain substantial quantities of unburned hydrocarbons and other undesirable combustion products. The exhaust gases comprise, for example, nitric oxide, sulfur dioxide, carbon monoxide and unburned hydrocarbons. Air pollution studies reveal that some of the combustion products of exhaust gases, primarily nitrogen oxide and unburned hydrocarbons, react with atmospheric oxygen in the presence of sunlight to pollute the atmosphere with smog which contains noxious irritants detrimental to comfort and health. Accordingly, extensive studies have been undertaken to find means to minimize the smog-forming potential of such gases.

Various schemes have been heretofore investigated for removal of these noxious compounds from exhaust gases. Changing of the design of gasoline engines to effect better combustion has been attempted. Also, flame afterburners to convert the unburned hydrocarbons by burning have been tried. However, none of these schemes have proven to be an adequate answer to the problem.

Investigators have turned to catalytic oxidation means for treating such gases to prevent air pollution. The destructive conversion of exhaust gases by catalytic treatment can be fundamentally accomplished in a small unit with inexpensive materials of construction. However, to translate the catalytic oxidation process into a practical and useful scheme for treating exhaust gases from internal combustion engines, a number of problems must be overcome, chief among which are the development of a carrier or base material for the oxidation catalyst that has high strength and high resistance to abrasion, as well as high temperature stability when impregnated with catalyst to resist reaction with the impregnant, and the development of suitable oxidation catalysts that have good catalytic activity at low temperatures after exposure to high temperatures and are not particularly susceptible to poisoning by lead salts and other gasoline additives found in the exhaust gases.

Inorganic metal oxides, such as silica, magnesia, titania and the like, have been used for many years as a carrier material for catalysts and, in some instances, as a catalyst itself. Active alumina in the form of pellets, cylinders and nodules has been used as a carrier or base for catalysts, and is often selected in preference to other materials because it is relatively inert and will maintain a comparatively high surface area over the temperature range normally encountered in many catalytic reactions. The active aluminas useful for catalyst support material have been prepared by various methods. For example, alumina trihydrate precipitated in the Bayer process may be ground and then heated at about 300° C. for about 2 hours followed by impregnating the active alumina with a catalyst. Then, too, active alumina that is useful as a support for catalysts has been prepared by reacting aluminum metal with a partially miscible alcohol, such as amyl alcohol, to form aluminum alcoholate. The aluminum alcoholate is hydrolyzed in the presence of ammonium hydroxide and carbon dioxide, calcined at temperatures of above about 400° C. and impregnated with a catalyst. The physical and chemical properties which active aluminas possess are strongly dependent on the procedures followed in their preparation. Consequently, the active alumina art is highly developed and is replete with disclosures for various manufacturing methods for optimizing certain characteristics of active alumina. Although active alumina has proved to be satisfactory for many purposes, its use, however, as a base or carrier in catalytic oxidation processes has not been entirely satisfactory. For example, the prior art active aluminas when impregnated with a catalyst do not possess the required high temperature stability to resist reaction with impregnants.

The active alumina shaped particles may be calcined to transform the active alumina partially or completely to alpha alumina at high temperatures (1000° C. or higher), however, the shaped particle, after the transformation from active alumina to alpha alumina, suffers an almost complete loss in strength and is easily crumbled by hand. Consequently, these alpha alumina shaped particles have not heretofore been usable as carriers or bases for oxidation catalysts because of the lack of strength.

According to the instant invention, there is presented superior and improved alpha alumina shaped particles that have high temperature stability, relatively large diameter pores, as well as a high resistance to abrasion and a high crushing strength. The pore characteristics are such that a major portion of the pore volume is made up of pores having a pore diameter greater than 580 A. (angstrom units). By pore volume is meant the total void space including both intra and inter crystalline voids. The crushing strength of the shaped particles exceeds 10 pounds per nodule, said strength based on 6 x 8 mesh (Tyler Screen Scale) nodules. Preferably, the crushing strength exceeds 15 lbs. per nodule. The alpha aumina of the invention can be produced by a particular and novel sequence of steps comprising flash calcining alumina trihydrate at temperatures above about 800° C. for a relatively short time, such as from a fraction of a second to ten seconds, to form active alumina comprising a mixture of chi and rho forms, forming the active alumina with water into shaped particles, and hardening the alumina until it becomes a self-sustaining mass, converting a major portion of the rehydrated alumina to an alumina phase of boehmite of pseudoboehmite, or mixtures thereof, and most important, calcining the alumina at a temperature in excess of about 1000° C. for a period of time sufficient to convert the transition alumina to alpha alumina and to develop pore characteristics wherein a major portion of the pore volume is constituted of pores having a diameter greater than 580 A.

The novel alpha alumina shaped particles manufactured by this process are particularly suitable as a base for oxidation catalysts in a system which requires the catalyst carrier to have a high crushing strength, high resistance to abrasion as well as pore characteristics as previously described. Furthermore, this invention provides for the adsorption of suitable oxidation catalysts on the novel alpha alumina carrier. It has been found that these catalysts when applied to the novel carrier of the invention are particularly effective for oxidizing the unburned hydrocarbons and carbon monoxide contained in automotive exhaust gases.

Other features and advantages will become apparent from the ensuing disclosure.

By practice of the instant invention, alumina trihydrate obtained from the Bayer process, i.e., $Al_2O_3 \cdot 3H_2O$, referred to as gibbsite alumina, is partially calcined by permitting it to fall into and rapidly pass through a flame, or hot gas stream issuing therefrom and maintained at a high temperature, for example, on the order of 800° C. or higher. The residence time of the powdered gibbsite alumina in the flame or hot gases in short and may be, for example, from a fraction of a second to about 10 seconds. The resulting calcined active alumina particles are then separated and recovered from the flame or exhaust gases. X-ray diffraction analysis of the resulting transition alumina particles has indicated that they are comprised of a mixture of chi and rho aluminas and are termed active because they have high surface areas and will absorb vapors or liquid readily. The active alumina has a specific surface area of 200 to 400 m.²/g., measured by the BET method (Brunauer, Emmett, Teller, JACS, vol. 60, p. 309 of 1938).

This active alumina powder is then formed into the desired shapes, i.e., nodules, pellets and the like. Preferably, the alumina is nodulized with water to the desired size in a suitable pan nodulizer. The weight ratio of alumina powder to water is usually about 2:1, respectively. The alumina nodules are generally formed to within a size range of from about 6–8 mesh (Tyler Screen Scale). However, any size desired can be made and, as stated above, other shaped particles can be formed, such as pellets and the like.

After the alumina has been formed, i.e., nodulized, the moist alumina is then hydraulically hardened or cured in a closed container. During the time the nodules are in the closed container, which is usually from about 1 to 4 hours, a rapid transformation of a minor portion of the active alumina to the pseudoboehmite form ($Al_2O_3 \cdot XH_2O$ wherein X is a value greater than 1 and less than 2) occurs. Pseudoboehmite is a transition aumina similar to boehmite, but it has a smaller crystallite size, generally a larger specific surface area and a larger $d$ (020) spacing by X-ray than that of boehmite. Pseudoboehmite has been discussed in the literature in J. Chem. Phys., vol. 55, pp. 341–53 (Thermal and Hydrothermal Transformations of Alumina by Tertian, R and Papée, D.). This transformation of a minor part of the nodulized active alumina to the pseudoboehmite form results in, among other things, hardening of the alumina nodules so that they are self-sustaining bodies and are capable of retaining their shape when placed in a stream of circulating water or in a pressure vessel containing water. Heat is generated during the hydration of the alumina, and without any external source of heat, the temperature in the closed container can reach 100° C. or higher, if steam is not released. An external source of heat may also be applied to the alumina in addition to the heat of hydration, by placing the container in an oven. The higher the temperature in the container, the shorter the time required to form a self-sustaining alumina body containing an appreciable amount of pseudoboehmite.

When the nodules are sufficiently hardened to form self-sustaining bodies, they are placed in circulating water maintained at a temperature range of from about 60° C. to about 100° C. for a period of time (e.g., of the order of 8 to 48 hours depending on the temperature) until a major portion of the transition alumina has been converted to the pseudoboehmite form. Preferably, the temperature of the water is maintained within the range of from about 80° C. to 90° C., and optimum results are produced when the water temperature is about 90° C. This subsequent hardening treatment increases the proportion of pseudoboehmite in the hydrated alumina. The rate of transformation to the pseudoboehmite form is accelerated when the temperature of the water is increased. Satisfactory results are obtained when at least 50%, or a major portion, of the hydrated alumina has been converted to the pseudoboehmite form. Preferably, at least about 70% to 75% conversion of the hydrated alumina to the pseudoboehmite form produces optimum results. During this step the soda content of the alumina may also be lowered considerably by replacing the circulating water with fresh, pure water or, alternatively, the soda contaminated water can be passed through an ion exchange column before recirculating said water to the alumina.

In an alternative embodiment of the invention, a major portion, more than 50%, of the hydrated alumina nodules that have been sufficiently hardened to form self-sustaining bodies may be converted to the boehmite form ($Al_2O_3 \cdot H_2O$) of alumina, rather than the pseudoboehmite form. This can be accomplished by introducing the alumina nodules, after they have been sufficiently hardened to be self-sustaining bodies, into a pressure vessel containing water, and heating the contents to about 120° C. or higher. Here, too, the rate of transformation of the hydrated transition alumina to the boehmite form is accelerated with an increase in temperature. For example, it has been found that 6 x 8 mesh (Tyler Screen Scale) alumina nodules are substantially converted to the boehmite form in two hours at a temperature of about 200° C.

The resulting nodules made by either of the two embodiments discussed above are then calcined by gradually heating said nodules to a temperature in excess of about 1000° C. and maintaining them at this temperature for a period of time sufficient to produce the novel alumina of the invention. For temperatures in the range of 1000° C. to 1300° C. the time of calcining said nodules at the temperature will range from about 70 hours to 10 minutes. Preferably, the calcination is accomplished at a temperature in the range of 1100° C. to 1300° C. wherein the time to form the novel alpha alumina is 4 hours or less. The pore volume of the alpha alumina shaped bodies is such that the major portion thereof is distributed in pores having diameters greater than 580 A. In view of this pore volume distribution, it would be expected that the alumina nodule would have very low resistance to crushing and low attrition resistance. However, as illustrated from the data disclosed hereinbelow, it is shown that the novel alpha alumina particles produced according to this invention have, in addition to the desirable pore characteristics, a surprisingly high crushing strength, i.e., in excess of 10 pounds per nodule (based on 6 x 8 mesh particles—Tyler Screen Scale), and a high abrasion resistance.

During calcination there is usually a small change in pore volume of the nodules, but a substantial change in pore volume distribution. This means that even though surface area decreases with increasing calcination temperature, it is the area provided by the extremely small pores which is being lost, and the volume of these pores is small compared to the total pore volume. The small change in pore volume is apparently due to the formation of a relatively few large pores at the expense of many small pores and attendant passageways.

It is apparent that the specific process described above is subject to numerous modifications, and in order to further illustrate the nature of the invention, the following examples may be taken as illustrative and not by way of limitation thereof.

X-ray diffraction analysis of the nodules indicated that they contained 10% bayerite, 71% pseudoboehmite, and 0.01% $Na_2O$.

The nodules were then removed from the water and calcined by gradually heating to temperatures ranging from 1000° C. to 1300° C. for times varying from 1 hour to 60 hours. Tables I-A and I-B below list the physical properties of the alpha alumina nodules after calcination.

TABLE I-A

| Sample No.[1] | Heat treatment | | Surface area, m.²/g. | Crushing strength, lb./nodule [2] | True dens., g./cc. | Pore volume, cc./g. | | |
|---|---|---|---|---|---|---|---|---|
| | Temp., ° C. | Time, hr. | | | | Macro | Micro | Total [3] |
| 1 (a) | 1,000 | 1 | 90.3 | 46.6 | 3.51 | 0.082 | 0.410 | 0.492 |
| 2 | 1,000 | 4 | 53.2 | 27.7 | 3.59 | 0.089 | 0.401 | 0.490 |
| 3 | 1,050 | 1 | 78.9 | 44.7 | 3.54 | 0.078 | 0.402 | 0.480 |
| 4 (b) | 1,050 | 4 | 44.8 | 22.8 | 3.86 | 0.177 | 0.269 | 0.446 |
| 5 | 1,110 | 1 | 44.8 | 33.8 | 3.66 | 0.104 | 0.372 | 0.476 |
| 6 (c) | 1,100 | 4 | 21.2 | 18.6 | 3.72 | 0.326 | 0.110 | 0.436 |
| 7 (d) | 1,100 | 60 | 25.3 | 11.4 | 3.77 | 0.413 | 0.067 | 0.480 |
| 8 | 1,150 | 1 | 19.0 | 22.6 | 3.84 | 0.317 | 0.117 | 0.434 |
| 9 (c) | 1,150 | 4 | 11.1 | 19.1 | 3.99 | 0.394 | 0.022 | 0.416 |
| 10 | 1,200 | 1 | 10.5 | 23.3 | 3.88 | 0.393 | 0 | 0.398 |
| 11 (e) | 1,200 | 4 | 8.3 | 22.1 | 3.99 | 0.394 | 0.022 | 0.404 |
| 12 | 1,250 | 1 | 10.2 | 21.7 | 3.88 | 0.398 | 0 | 0.398 |
| 13 (f) | 1,250 | 4 | 5.2 | 28.9 | 3.96 | 0.344 | 0 | 0.344 |
| 14 | 1,300 | 1 | 6.5 | 25.3 | 3.89 | 0.383 | 0 | 0.383 |
| 15 (f) | 1,300 | 4 | 4.7 | 26.5 | 3.92 | 0.350 | 0 | 0.350 |

[1] XRD analyses:
(a) $\alpha$-$Al_2O_3$, Tr; k-$Al_2O_3$, M; $\theta$-$\delta$-$Al_2O_3$, M.
(b) $\alpha$-$Al_2O_3$, M; k-$Al_2O_2$, Mr; $\theta$-$\delta$-$Al_2O_3$, M.
(c) $\alpha$-$Al_2O_3$, M; transition phases, Mr to Tr.
(d) $\alpha$-$Al_2O_3$, M; transition phases, Tr.
(e) $\alpha$-$Al_2O_3$, M; transition phases, Mr.
(f) $\alpha$-$Al_2O_3$, M; transition phases, PTr.
M=major, Tr=trace, PTr=possible trace, Mr=minor.

[2] The crushing strength per nodule refers to the weight required to cause a single nodule to abruptly collapse between two flat surfaces. The crushing strength is based on 6 x 8 mesh nodules.
[3] The volume listed under macro is that volume comprised of pores having a diameter greater than 580 A. while the pore volume listed under micro is that volume comprised of pores having a diameter less than 580 A.

TABLE I-B.—PORE VOLUME DISTRIBUTION—PERCENT OF TOTAL PORE VOLUME IN PORES OF DIAMETER GREATER THAN STATED SIZE IN MICRONS [1]

| Sample No. | 31.8 | 16.7 | 8.9 | 3.9 | 2.5 | 1.5 | 0.80 | 0.65 | 0.34 | 0.23 | 0.17 | 0.12 | 0.087 | 0.069 | 0.058 |
|---|---|---|---|---|---|---|---|---|---|---|---|---|---|---|---|
| 1 | 0 | 1.22 | 1.83 | 3.26 | 3.86 | 4.47 | 6.5 | 7.73 | 12.2 | 12.81 | 14.0 | 14.6 | 15.4 | 16.0 | 16.7 |
| 2 | 0 | 0 | 1.43 | 2.04 | 2.45 | 2.65 | 4.09 | 6.12 | 10.2 | 12.0 | 12.7 | 13.7 | 15.3 | 16.3 | 18.2 |
| 3 | 0 | 0.63 | 1.46 | 2.71 | 4.16 | 4.79 | 5.42 | 6.87 | 10.8 | 13.5 | 14.2 | 15.0 | 15.6 | 16.3 | 16.3 |
| 4 | 0 | 0 | 0.68 | 1.57 | 2.24 | 2.69 | 4.48 | 5.83 | 10.3 | 12.3 | 13.2 | 14.3 | 17.1 | 26.7 | 39.7 |
| 5 | 0 | 1.26 | 2.10 | 3.36 | 4.0 | 4.85 | 6.10 | 6.72 | 11.5 | 13.0 | 13.6 | 14.9 | 16.4 | 18.5 | 21.9 |
| 6 | 0 | 0 | 0 | 1.14 | 1.83 | 2.53 | 5.05 | 6.90 | 11.4 | 13.5 | 14.9 | 17.2 | 29.0 | 62.5 | 76.4 |
| 7 | | | | | | | | | | | | | | | |
| 8 | 0 | 0.69 | 1.38 | 3.46 | 4.15 | 5.53 | 7.84 | 9.22 | 13.4 | 15.4 | 16.8 | 26.0 | 43.0 | 62.5 | 73.1 |
| 9 | 0 | 0 | 1.20 | 2.41 | 2.41 | 3.13 | 6.25 | 7.70 | 12.7 | 14.7 | 16.6 | 25.5 | 59.9 | 88.2 | 94.6 |
| 10 | 0 | 0.76 | 2.26 | 3.02 | 4.52 | 5.29 | 7.55 | 9.05 | 14.1 | 17.3 | 18.9 | 30.7 | 65.9 | 91.5 | 98.7 |
| 11 | 0 | 0.74 | 1.48 | 3.08 | 3.71 | 4.45 | 8.16 | 9.65 | 14.6 | 16.8 | 19.8 | 51.5 | 89.6 | 98.5 | 100.0 |
| 12 | 0 | 1.00 | 1.76 | 2.77 | 3.27 | 3.00 | 9.55 | 12.3 | 16.1 | 19.4 | 25.6 | 57.8 | 88.0 | 97.4 | 100.0 |
| 13 | 0 | 0 | 1.75 | 2.61 | 3.20 | 4.07 | 9.30 | 10.8 | 15.7 | 20.0 | 30.0 | 83.4 | 96.5 | 99.2 | 100.0 |
| 14 | 0 | 0.78 | 1.30 | 2.87 | 3.30 | 4.18 | 6.86 | 9.66 | 15.4 | 18.8 | 26.7 | 65.0 | 91.0 | 98.0 | 100.0 |
| 15 | 0 | 0 | 1.14 | 2.57 | 3.71 | 4.57 | 9.43 | 10.9 | 16.5 | 22.9 | 44.9 | 93.7 | 99.0 | 100.0 | 100.0 |

[1] Porosity measurements were made with an Aminco-Winslow Porosimeter (American Instrument Co., Inc.). This Porosimeter is based on the mercury intrusion principle whereby samples are immersed in mercury and subjected to varying degrees of pressure. The amount of mercury forced into the pores of the material is measured at specific pressure intervals. Pressure and volumetric readings can be plotted then on semi-log graph paper from which pore diameter and penetration can be extracted directly.

Example A

A quantity of gibbsite alumina ($Al_2O_3 \cdot 3H_2O$), product of a Bayer plant, was heated at 815° C. quasi-instantaneously in a hot gas stream. The resulting calcined alumina was separated from the gas stream and then ground on a hammermill, until a product having 80%—20 micron particle size was obtained. This material was then identified by X-ray diffraction analysis and found to contain the "chi-rho" forms of active alumina. This active alumina was formed with water into shaped particles, 6 x 8 mesh nodules (Tyler Screen Scale) in a pan nodulizer. The alumina-to-water ratio was 2:1. These nodules were then sealed in cans at room temperature for 1½ hours. The heat of hydration was such, that in this time the nodules were heated to 80° C. or slightly higher, causing them to be self-sustaining and sufficiently hard due to the formation of appreciable pseudoboehmite, so that they could be immersed in a stream of water and retain their shape.

It is to be noted that there is considerable latitude in the manner in which the pseudoboehmite may be formed in the finished nodule. For example, the fresh nodules in a sealed container can be placed in an oven at 80° C. or higher to accelerate the development of pseudoboehmite in the nodule before they are immersed in water.

The nodules were then placed in a circulating stream of water maintained at a temperature of about 90° C. for about 48 hours. Soda content was continuously removed from the alumina by circulating fresh water therethrough.

From Tables I-A and I-B above, it can be seen that when high pseudoboehmite alumina is calcined according to the invention, a major portion of the pore volume is made up of pores having a pore diameter greater than 580 A., for Sample Nos. 6 through 15 inclusive. In the case of Sample Nos. 1 through 5 inclusive, although the crushing strengths are high, the temperatures and/or times of calcining have not been sufficient to produce nodules wherein the major portion of the pore volume is comprised of pores having a diameter greater than 580 A. Sample Nos. 6 through 15 inclusive have, in addition to the satisfactory pore characteristics, satisfactory high crushing strengths ranging from 11.4 lbs./nodule for Sample No. 7 to 28.9 lbs./nodule for Sample No. 13.

Example B

A preparation similar to that described in Example A was made, except that the fresh nodules were left sealed in a container for 3 days at room temperature before placing them in circulating water at 90° C. After 2 days, in circulating water, X-ray diffraction analysis indicated the alumina contained 24% bayerite and 54% pseudoboehmite. These nodules were gradually heated to 1100° C. and 1200° C. in about 3 hours and then maintained at this temperature for the times indicated. Table II lists the physical properties of the alpha alumina nodules after calcination in which a major portion of the pore volume is made up of pores having a pore diameter greater than 580 A.

TABLE II

| Heat treatment | | Surface area, m.²/g. | Crushing strength, lb./nodule | Pore volume | | True dens., g./cc. | XRD analyses |
|---|---|---|---|---|---|---|---|
| Temp., °C. | Time, hr. | | | Macro, cc./g. | Micro, cc./g. | | |
| 1,100 | 4 | 24.8 | 15.7 | 0.305 | 0.152 | 3.76 | α-Al₂O₃, M; k-Al₂O₃, Mr; δ-θ-Al₂O₃, Mr. |
| 1,200 | 1 | 13.2 | 17.4 | | | | α-Al₂O₃, M; transition aluminas, Mr. |

Example C

Boehmite nodules were prepared accroding to the process described above in Example A, with the exception that the self-sustaining nodules from the sealed containers were placed in a pressure vessel containing water and heated to 120° C., rather than in a circulating stream of heated water. The nodules of hydrated transition alumina were converted in the pressure vessel to boehmite nodules, and then calcined at temperatures up to 1300° C. as shown below in Table III. Porosity determinations indicate that a major portion of the pore volume is made up of pores having a pore diameter greater than 580 A.

TABLE III.—HEAT TREATMENT OF BOEHMITE NODULES

| Sample No. | Heat treatment | | Surface area, m.²/g. | Crushing strength, lb. | Pore Volume | | | True dens., g./cc. |
|---|---|---|---|---|---|---|---|---|
| | Temp.,° C. | Time, hr. | | | Macro, cc./g. | Micro, cc./g. | Total | |
| 1 (a) | 1,000 | 1 | 55 | 17 | 0.153 | 0.390 | 0.543 | 3.33 |
| 2 | 1,000 | 48 | 36 | | 0.156 | 0.378 | 0.534 | 3.49 |
| 3 | 1,000 | 70 | 32 | 14 | 0.207 | 0.220 | 0.427 | 3.60 |
| 4 | 1,050 | 63 | 12 | 10 | 0.387 | 0.079 | 0.466 | 3.72 |
| 5 (b) | 1,100 | 8 | 23 | 19 | 0.299 | 0.106 | 0.405 | 3.72 |
| 6 | 1,100 | 16 | 13 | 17 | 0.343 | 0.070 | 0.413 | 3.78 |
| 7 | 1,150 | 1 | 30 | 24 | 0.207 | 0.217 | 0.424 | 3.52 |
| 8 | 1,200 | ¼ | 14 | 23 | 0.280 | 0.105 | 0.385 | 3.76 |
| 9 | 1,200 | ½ | 13 | 23 | 0.301 | 0.080 | 0.381 | 3.76 |
| 10 | 1,200 | 1 | 11 | 21 | 0.309 | 0.061 | 0.370 | 3.80 |
| 11 (c) | 1,300 | 1 | 6 | 22 | 0.381 | 0.062 | 0.443 | 3.83 |
| 12 | 1,300 | 4 | 5 | 24 | 0.342 | 0.000 | 0.342 | 3.87 |

XRD analysis:
(a) δ, θ, k—M; δ, θ, k-Al₂O₃'s are high temp. transition phases intermediate between active aluminas and α-Al₂O₃.
(b) α-Al₂O₃—M to Mr; θ-Al₂O₃—Mr to M.
(c) α-Al₂O₃—M; δ, θ, k—Tr.
M=major, Mr=minor, Tr=trace.

It is to be noted in Table III that Sample Nos. 4 through 13 inclusive exhibit high crushing strengths as well as having pore characteristics such that a major portion of the pore volume is made up of pores having a pore diameter greater than 580 A.

Example D

Two sample quantities (denoted as A and B) of alpha alumina nodules 6 x 8 mesh (Tyler Screen Scale) were made according to the process described under Example A above. The nodules in each instance were calcined at 1150° C. for 1 hour. The properties of Samples A and B are shown in Table IV.

TABLE IV

| Sample | A* | B |
|---|---|---|
| Nodule size, mesh | 6 x 8 | 6 x 8 |
| Percent total void vol. due to pores>580 A. in diam. | 81.1 | 85.7 |
| Surface area, m.²/g. | 23 | 19 |
| Crushing strength, lb. | 19 | 17 |

*XRD analysis—Sample A: Alpha, 65% delta-theta, M to Mr; kappa, trace.

Samples A and B were tested for abrasion resistance in the following manner. A 3-inch-deep bed of nodules, consisting of a 50–50 mixture of Sample A and Sample B, contained over a 6-inch square (36 in.²) of 16-mesh screen, was shaken at 1750 cycles per minute with ¹⁄₁₆ inch of horizontal travel for 100 and 200 hours' duration with the following losses through the screen: 0–100 hours, 3.4% and 100–200 hours, 2.4%, for a total for 200 hours of 5.7%.

The novel alpha alumina prepared as described above may be impregnated with any suitable oxidation catalyst. Representative oxidation catalysts suitable are, for example, manganese oxide, manganese-silver oxide, cobalt oxide, nickel oxide, chromium oxide, vanadium oxide, etc.

A catalyst that is used to oxidize exhaust gases of internal combustion engines should possess the following qualities:

(a) It must effect at least the partial oxidation of carbon monoxide and hydrocarbons contained in the exhaust gases at temperatures as low as about 200° C. in order that reduction in the gaseous components begin soon after starting a cold engine, (b) The activity of the catalyst should be high enough so that the weight of the catalyst required for an automobile is no more than, for example, 8 to 15 pounds, (c) The catalyst should be capable of withstanding temperatures as high as 900° C., or more without loss of activity at the lower temperatures, (d) The catalyst must also maintain activity for a specified lengthy operational period, (e) Be resistant to poisoning from gasoline additives such as lead, boron, phosphates, etc., and most important, (f) It must be of high strength and high abrasion resistance.

It has been found that the catalysts manganese oxide and mixtures of manganese and silver oxides when impregnated on the novel alpha alumina shaped particles of the invention possess the above characteristics and are especially effective for oxidizing exhaust gases from internal combustion engines.

The manganese catalyst may be applied to the alpha alumina, prepared as disclosed herein, by impregnating the alumina with a solution of a manganese salt, e.g., Mn(NO₃)₂. Preferably, the concentration of the catalyst on alpha alumina will contain about 2–5% by weight manganese. Lesser amounts of manganese on the catalyst results in a lower activity, and higher amounts do not substantially increase the activity over that obtained with a 2–5% manganese concentration. Therefore, although the preferred concentration of the manganese catalyst is from 2–5%, lower or higher concentrations can also be used. Alternatively, a quantity of silver may be added to the alumina in combination with manganese and, therefore, the alpha alumina is impregnated with a mixture of a solution of Mn(NO₃)₂ and AgNO₃. Preferably, the manganese and silver concentration of the solution are such as to give a 2–7% by weight manganese and an 0.1–1% by weight silver concentration in the final catalyst on the alpha alumina, however, higher and lower concentrations are operable.

The manganese catalyst is applied to the carrier by immersing the alpha alumina in a salt solution of the catalytic material, thus impregnating the carrier with the catalyst. For example, when manganese oxides are impregnated on the alumina support, a solution of manganese nitrate is prepared and the alumina is immersed in the manganese nitrate solution. To assure homogeneous impregnation of the manganese on the alumina, the salt solution may be acidified with nitric acid so that any basic constituents of the nodules are neutralized, thus preventing the precipitation of manganese hydroxide at localized centers. Then, too, the rate of impregantion of the catalyst on the carrier can be increased by drawing a vacuum on the nodules to remove air contained in the pores of the alpha alumina base. After the manganese salt is applied to the alpha alumina, the carrier and catalyst are heated at an elevated temperture, e.g., about 850° C. to 950° C., for a period of time to produce a catalyst of high catalytic activity. The time of heating will range, for example, from about 10 hours to 1 hour for the temperature range given. The manganese and silver can be applied to the support singularly or in admixture. When applied singularly, the manganese should be applied to the alumina and heated (e.g., 850° C. to 950° C.) to decompose it to the metal oxide, followed by impregnating the silver on the carrier and likewise heating to decompose the salt to the oxide.

The invention is further illustrated illustrated by the following specific examples which demonstrate the utility of the catalyst in combination with the novel alpha alumina in high temperature systems involving the oxidation of carbon monoxide and hydrocarbons emitted by gasoline engines.

Example E

Fifty gram samples of alpha alumina nodules, one prepared from a pseudoboehmite precursor as in Example A and the other prepared from a boehmite precursor as in Example C, were each immersed in 100 ml. of 100 g.p.l. of manganese nitrate.

Homogeneous impregnation of the manganese nitrate solution was obtained by acidifying the solution with 1 N $HNO_3$ in order to neutralize the basic constituents of the alpha alumina nodules, thus preventing the precipitation of manganese hydroxide at localized centers. The rate of impregnation may be increased by drawing a vacuum on the nodules to remove air contained in the pores of the alumina base.

After the nodules were impregnated with manganese nitrate they were separated from the solution. The impregnated nodules were then calcined at the times and temperatures shown in Table V. After calcination of the catalysts, XRD analysis showed the presence of $Mn_2O_3$, $Mn_3O_4$ and $MnO \cdot Al_2O_3$.

The alpha alumina impregnated catalysts were tested for oxidation activity in an experimental reactor consisting of a 1¼ inch I.D. Vycor tube which was externally heated. Gases, entering the reactor through the bottom, were preheated by a layer of Vycor chips, and then passed up through about 1½ inches of catalyst bed. A thermocouple in a Vycor well was placed about ⅜ inch down into the bed. Samples of gases were taken both before and after the reactor by Dynapumps which in turn fed the analytical instruments, i.e., the flame ionization detector and gas chromatograph.

Catalytic activity of the nodules is shown below in Table V and therein compared with an oxidation catalyst (referred to in Table V as "x catalyst") referred to in "Thermal Considerations in Exhaust Emission Control Systems," C. M. Heinen; Society of Automotive Engineers, Paper No. 486 J presented at National Automobile Week, Mar. 12–16, 1962; Detroit, Mich.

TABLE V

| Catalyst | Metal oxide as metal, Percent on base (Mn) | Method of impreg. of metal $NO_3^-$ | Pretreatment of catalyst Time, hrs. | Pretreatment of catalyst Temp., °C. | Surface area, m.²/g. | Gas Tested | Percent reacted at temp., °C. 200 | 250 | 300 | 400 |
|---|---|---|---|---|---|---|---|---|---|---|
| X | | | | | | Hydrocarbons | 36 | 51 | 64 | 84 |
|   | | | | | | CO | 36 | 51 | 64 | 84 |
| Mn on alpha alumina from high pseudoboehmite. | 6.4 | (¹) | 15 | 915 | 8 | Hexane | 5 | 74 | 84 | 99 |
|   | | | | | | CO | 0 | 91 | 99 | 100 |
| Mn on alpha alumina from boehmite. | 3.3 | | 8 | 870 | 11 | Hexane | 20 | 76 | 88 | 99 |
|   | | | | | | CO | 17 | 88 | 100 | 100 |

¹ 15 min. impreg. under vacuum.

Example F

Alpha alumina prepared as described above in Example A was impregnated with a mixture of a solution of manganese nitrate and silver nitrate to provide an amount of manganese and silver oxides equivalent to 4.3% by weight maganese and 0.29% by weight silver on the alpha alumina base. The solution contained sufficient $HNO_3$ to neutralize any alkali in the nodules. The alpha alumina nodules were heated at about 870° C. for 8 hours.

Catalytic activity was tested in a 1½ inch I.D. Vycor tube as described in Example E above and the results are shown in Table VI.

A further sample of alpha alumina, derived from a pseudoboehmite precursor was impregnated by applying manganese nitrate and silver nitrate solutions to the alpha alumina base singularly. First, the alpha alumina was impregnated with manganese nitrate to provide a manganese oxide content equivalent to 2.3% Mn when heated to 870° C. for 3 hours. Then the sample was impregnated with silver nitrate to provide a silver oxide content equivalent to 0.35% Ag when heated to 870° C. for about 8 hours.

Catalytic activity was tested in a 1½ inch I.D. Vycor tube as described in Example D above and the results are shown in Table VI. In Table VI the samples are compared to the "x catalyst" which is described in Example E.

TABLE VI

| Catalyst | Metal oxide as metal percent on base | Method of impreg. of metal $NO_3^-$ | Pretreatment of catalyst Time, hr. | Pretreatment of catalyst Temp., °C. | Surface area, m.²/g. | Gas Tested | Percent reacted at temp., °C. 200 | 250 | 300 | 400 |
|---|---|---|---|---|---|---|---|---|---|---|
|   | | | | | | Hydrocargons | 36 | 51 | 64 | 84 |
|   | | | | | | CO | 36 | 51 | 64 | 84 |
| Mn and Ag on alpha alumina from high pseudoboehmite. | 4.3 Mn 0.29 Ag | Mixed nitrates | 8 | 870 | 10.6 | Hexane | 42 | 56 | 68 | 95 |
|   | | | | | | CO | 94 | 100 | 100 | 100 |
| Mn and Ag on alpha alumina from boehmite. | 2.3 Mn 0.35 Ag | $Mn(NO_3)$, 1st $Ag(NO_3)_2$, 2nd | 3 8 | 870 870 | 9.2 | Hexane | 34 | 44 | 74 | 98 |
|   | | | | | | CO | 70 | 100 | 100 | 100 |

It is to be understood that various changes and modifications may be made in the foregoing invention without departing from the spirit of the invention and the scope of the appended claims.

What is claimed is:

1. A method for preparing alpha alumina shaped bodies which comprises:

(a) passing particulate alumina trihydrate rapidly through a stream of hot gases maintained at a temperature not less than about 800° C. for not more than about ten seconds to form an active alumina comprising a mixture of chi and rho forms of alumina having a specific surface area of about 200–400 m.²/g. and, (b) forming the active alumina with water into shaped bodies and rehydrating and hardening said bodies in a closed container so that they will become self-sustaining, (c) converting a major portion of the rehydrated alumina to an alumina phase selected from the group consisting of pseudoboehmite and boehmite, or mixtures thereof by contact with water, and (d) calcining the alumina at a temperature in excess of about 1000° C. for a period of time sufficient to produce an alpha alumina having a pore volume distribution such that a major portion of the pores have a diameter greater than 580 A. and a crushing strength not less than about ten pounds per body, said strength based on 6 x 8 mesh bodies.

2. A method for preparing alpha alumina shaped particles which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles, (c) hydraulically hardening the active alumina particles by placing them in a closed container for a period of time sufficient for the heat of hydration to promote a sufficient amount of pseudoboehmite to render the particles self-sustaining, (d) converting a major portion of the alumina to the pseudoboehmite phase by contacting said alumina with circulating water maintained within a temperature range of from 60° C. to about 100° C., and (e) gradually heating the particles to a temperature in the range of about 1000° C. to 1300° C. and calcining the particles at said temperature for a period of time sufficient to produce an alpha alumina having a pore volume distribution such that a major portion of the pores have a diameter greater than 580 A. and a crushing strength not less than about ten pounds per particle, said strength based on 6 x 8 mesh particles.

3. A method for preparing alpha alumina shaped particles especially adapted for use as a catalyst support which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles, (c) hydraulically hardening the active alumina particles by placing them in a closed container for a period of time sufficient for the heat of hydration to promote a sufficient amount of pseudoboehmite to render the particles self-sustaining.

(d) subjecting the particles to a further hardening treatment at a temperature in the range of 60° C. to about 100° C. for about 8 to 48 hours in the presence of circulating water, and (e) gradually heating the particles to a temperature in the range of about 1000° C. to 1300° C. and calcining the particles at said temperature for a period of time sufficient to produce an alpha alumina having a pore volume distribution such that a major portion of the pores have a diameter greater than 580 A. and a crushing strength not less than about ten pounds per particle, said strength based on 6 x 8 mesh particles.

4. In the method for preparing alpha alumina shaped particles especially adapted for use as a catalyst support by impregnating alpha alumina with an oxidation catalyst, the improvement which comprises:

(a) passing particulate alumina trihydrate rapidly through a stream of hot gases to form an active alumina comprising a mixture of chi and rho forms of alumina, (b) forming the active alumina with water into shaped particles, (c) hydraulically hardening the active alumina particles by placing them in a closed container for a period of time sufficient for the heat of hydration to promote a sufficient amount of pseudoboehmite to render the particles self-sustaining, (d) subjecting the particles to a further hardening treatment at a temperature in the range of 60° C. to about 100° C. for about 8 to 48 hours in the presence of circulating water, (e) gradually heating the particles to a temperature in the range of about 1000° C. to 1300° C. and calcining the particles at said temperature for a period of time sufficient to produce an alpha alumina having a pore volume distribution such that a major portion of the pores have a diameter greater than 580 A., and a crushing strength not less than about ten pounds per particle, said strength based on 6 x 8 mesh particles.

5. The method according to claim 4 wherein the oxidation catalyst is manganese oxide.

6. The method according to claim 4 wherein the oxidation catalyst is a mixture of manganese and silver oxides.

7. In the method for preparing catalyst-impregnated alpha alumina shaped particles by impregnating alpha alumina with an oxidation catalyst, the improvement which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles and rehydrating and hardening said particles in a closed container until they are self-sustaining, (c) converting a major portion of the rehydrated alumina to the pseudoboehmite phase by contacting said alumina with circulating water heated to from about 60° C. to about 100° C.

(d) gradually heating said particles to a temperature within the range of about 1000° C. to 1300° C. and calcining the particles at said temperature for a period of time sufficient to produce an alpha alumina having a pore volume distribution such that a major portion of the pores have a diameter greater than 580 A., and a crushing strength not less than about ten pounds per particle, said strength based on 6 x 8 mesh particles and (e) impregnating the alpha alumina with a catalyst selected from the group consisting of manganese and manganese and silver salts and heating the impregnated alumina for about 8 to 4 hours within a temperature range of from about 870° C. to 920° C.

8. A method for preparing alpha alumina shaped particles especially adapted for use as a catalyst support which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles and rehydrating and hardening said particles in a closed container until they are self-sustaining, (c) converting a major portion of the alumina to the boehmite phase by contacting said alumina with water in a pressure vessel at a temperature above about 120° C., and (d) gradually heating the particles to a temperature in excess of about 1000° C. and calcining the particles at said temperature for a period of time sufficient to produce an alpha alumina having a pore volume distribution such that a major portion of the pores have a diameter greater than 580 A., and a crushing strength not less than about ten pounds per particle, said strength based on 6 x 8 mesh particles.

9. A method for preparing alpha alumina shaped particles especially adapted for use as a catalyst support which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles and rehydrating and hardening said particles in a closed container until they are self-sustaining, (c) converting a major portion of the alumina to the boehmite phase by contacting said alumina with water in a pressure vessel at a temperature above about 120° C., and (d) gradually heating the particles to a temperature in the range of about 1000° C. to 1300° C. and calcining the particles at said temperature for a period of time sufficient to produce an alpha alumina having a pore volume distribution such that a major portion of the pores have a diameter greater than 580 A., and a crushing strength not less than about ten pounds per particle, said strength based on 6 x 8 mesh particles.

10. In the method for preparing alpha alumina shaped particles especially adapted for use as a catalyst support by impregnating alpha alumina with an oxidation catalyst, the improvement which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles and rehydrating and hardening said particles in a closed container until they are self-sustaining, (c) converting a major portion of the boehmite phase by contacting said alumina with water in a pressure vessel at a temperature of about 120° C., (d) gradually heating the particles to a temperature in the range of about 1000° C. to 1300° C. and calcining the particles at said temperature for a period of time sufficient to produce an alpha alumina having a pore volume distribution such that a major portion of the pores have a diameter greater than 580 A. and a crushing strength not less than about tend pounds per particle, said strength based on 6 x 8 mesh particles.

11. The method according to claim 10 wherein the oxidation catalyst is manganese oxide.

12. The method according to claim 10 wherein the oxidation catalyst is a mixture of manganese and silver oxides.

13. In the method for preparing catalyst impregnated alpha alumina shaped particles by impregnating alpha alumina with an oxidation catalyst, the improvement which comprises:

(a) passing particulate alumina trihydrate rapidly through a stream of hot gases maintained at a temperature not less than about 800° C. for not more than about ten seconds to form an active alumina having a specific surface area of about 200–400 m.²/g. and comprising a mixture of chi and rho forms of alumina, (b) forming the active alumina with water into shaped particles and rehydrating and hardening said particles in a closed container until they are self-sustaining, (c) converting a major portion of the alumina to the boehmite phase by contacting said alumina with water in a pressure vessel at a temperature of about 120° C., (d) gradually heating the particles to a temperature in the range of about 1000° C. to 1300° C. and calcining the particles at said temperature for a period of time sufficient to produce an alpha alumina having a pore volume distribution such that a major portion of the pores have a diameter greater than 580 A. and a crushing strength not less than about ten pounds per particle, said strength based on 6 x 8 mesh particles, and (e) impregnating the alpha alumina with a catalyst selected from the group consisting of manganese and manganese and silver salts and heating the impregnated alumina for about 8 to 4 hours within the temperature range from about 870° C. to 920° C.

References Cited

UNITED STATES PATENTS

| | | | |
|---|---|---|---|
| 2,758,011 | 8/1956 | Bloch | 23—143 |
| 2,773,844 | 12/1956 | Carlson et al. | 252—463 |
| 2,881,051 | 4/1959 | Pingard | 23—143 |
| 2,901,441 | 8/1959 | Waterman | 252—463 |
| 3,222,129 | 12/1965 | Osment et al. | 23—141 |
| 3,223,483 | 12/1965 | Osment | 23—143 |
| 3,226,191 | 12/1965 | Osment et al. | 23—141 |
| 3,251,783 | 5/1966 | Keith et al. | 252—463 |
| 2,800,518 | 7/1957 | Pitzer | 23—143 X |
| 3,305,492 | 2/1967 | Ameen | 252—463 |
| 3,310,366 | 3/1967 | Koepernik | 23—143 X |

OTHER REFERENCES

Newsome et al., Alumina Properties, Technical Paper No. 10, Aluminum Co. of America, Pittsburgh, Pa., pp. 34, 46.

OSCAR R. VERTIZ, *Primary Examiner.*

MAURICE A. BRINDISI, HERBERT T. CARTER,
*Examiners.*

G. OZAKI, *Assistant Examiner.*

UNITED STATES PATENT OFFICE
CERTIFICATE OF CORRECTION

Patent No. 3,392,125                                    July 9, 1968

Allan C. Kelly et al.

It is certified that error appears in the above identified patent and that said Letters Patent are hereby corrected as shown below:

Column 3, line 55, "aumina" should read -- alumina --; lines 71 and 72, "released," should read -- released. --. Columns 5 and 6, TABLE I-A, fourth column, line 5 thereof, "44.8" should read -- 48.8 --; same columns 5 and 6, TABLE I-B, tenth column, line 5 thereof, "11.5" should read -- 11.6 --; same table, same column, line 6 thereof, "11.4" should read -- 11.7 --; same table, same column, line 10 thereof, "14.1" should read -- 15.1 --. Column 9, line 10, "impregantion" should read -- impregnation --; line 15, "temperture" should read -- temperature --; line 38, cancel "illustrated", second occurrence. Column 10, line 35, "maganese" should read -- manganese --. Columns 10 and 11, TABLE VI, seventh column, line 1 thereof, "Hydrocargons" should read -- Hydrocarbons --; same table, eighth column, line 6 thereof, "70" should read -- 79 --. Column 11, line 4, beginning with "comprising" cancel all to and including "m.$^2$/g. and," in line 6, same column 11, and insert -- having a specific surface area of about 200-400 m. 2/g. and comprising a mixture of chi and rho forms of alumina, --. Column 14, line 3, "tend" should read -- ten --.

Signed and sealed this 7th day of April 1970.

(SEAL)
Attest:

EDWARD M. FLETCHER, JR.                        WILLIAM E. SCHUYLER, JR.
Attesting Officer                                   Commissioner of Patents